US012103043B2

(12) United States Patent
Takev

(10) Patent No.: US 12,103,043 B2
(45) Date of Patent: Oct. 1, 2024

(54) SYSTEMS, DEVICES, AND METHODS FOR SCREENING PANEL ATTACHMENT

(71) Applicant: W.S. Tyler Canada Ltd., St. Catharines (CA)

(72) Inventor: Dieter Takev, St. Catharines (CA)

( * ) Notice: Subject to any disclaimer, the term of this patent is extended or adjusted under 35 U.S.C. 154(b) by 0 days.

(21) Appl. No.: 17/476,719

(22) Filed: Sep. 16, 2021

(65) Prior Publication Data

US 2022/0088641 A1 Mar. 24, 2022

Related U.S. Application Data

(60) Provisional application No. 63/080,379, filed on Sep. 18, 2020.

(51) Int. Cl.
*B07B 1/46* (2006.01)
*B07B 1/28* (2006.01)

(52) U.S. Cl.
CPC .................. *B07B 1/46* (2013.01); *B07B 1/28* (2013.01); *B07B 2201/02* (2013.01)

(58) Field of Classification Search
CPC ......... B07B 1/46; B07B 1/28; B07B 2201/02; B07B 1/4645
USPC .......................................................... 209/233
See application file for complete search history.

(56) References Cited

U.S. PATENT DOCUMENTS 5,277,319 A * 1/1994 Henry, Jr. ............. B07B 1/4645 209/403
5,464,101 A 11/1995 Freissle
5,938,042 A 8/1999 Freissle et al.
6,260,813 B1 * 7/2001 Whitcomb ............. F16B 7/187 244/118.6
7,413,087 B2 8/2008 Kriel
8,025,153 B2 9/2011 Freissle et al.
10,864,579 B2 * 12/2020 Nishimiya ............... B23Q 3/00
2010/0025307 A1 2/2010 Freissle et al.
2012/0234737 A1 * 9/2012 Connolly .............. B07B 1/4645 209/405
2014/0210150 A1 * 7/2014 Bishop .................... B25B 5/103 269/101
2020/0032874 A1 * 1/2020 Amruthnath ........ G01M 5/0033
2021/0088310 A1 * 3/2021 Planck .................. F41G 11/003

OTHER PUBLICATIONS

PipeTop II Stringer System, Prior to Sep. 16, 2021, pp. 1-2, Polydeck Screen Corporation, Published online at https://polydeck.com.
Saddle Top and T-Bar Rail Systems, Prior to Sep. 16, 2021, pp. 1-4, Multotec (Pty) Ltd., Published online at https://www.multotec.com.

* cited by examiner

*Primary Examiner* — Jacob S. Scott
*Assistant Examiner* — Miraj T. Patel
(74) *Attorney, Agent, or Firm* — HEER LAW; Christopher Heer; Stephano Salani

(57) ABSTRACT

A device, assembly, and methods for connecting a panel. The device includes an insert insertable at one or more structural components, the insert connectible to a hardware component, the hardware component connectible to a panel to releasably secure the panel to at least one of the one or more structural components.

19 Claims, 16 Drawing Sheets

SYSTEMS, DEVICES, AND METHODS FOR SCREENING PANEL ATTACHMENT

FIELD

The present disclosure generally relates to the field of screening panels, and, in particular, to systems, devices, and methods for attaching a screening panel to a structural component such as a rail.

BACKGROUND

Screening panels can be used at a structural component such as a rail to separate minerals, aggregates, chemicals, or granular products in various industries. These panels can be installed at the rail and vibrate to effect the separation. Replacement of the screening panel, rails, or hardware used to fasten screening panels to the rails may desirable to address wear to the installation caused by the granular products and vibration.

SUMMARY

According to an aspect, a device includes an insert insertable at one or more structural components, the insert connectible to a hardware component, the hardware component connectible to a panel to releasably secure the panel to at least one of the one or more structural components.

In some embodiments, the insert has a top opening dimensioned to receive the hardware component.

In some embodiments, the insert is configured to be releasably retained at a top surface of the one or more structural components.

In some embodiments, the insert protrudes from at least one lateral surface of at least one of the one or more structural components.

In some embodiments, the insert is insertable at the one or more structural components at one or more cavities each defined at a top surface of each of the one or more structural components, the insert having a top opening dimensioned to receive the hardware component.

In some embodiments, the top opening is flush with the top surface of each of the one or more structural components.

In some embodiments, the insert is insertable at one of the one or more structural components at a cavity defined at a lateral surface of the structural component, the insert having an opening dimensioned to receive the hardware component.

In some embodiments, the opening is a top opening.

In some embodiments, the insert is releasably engaged with the one or more structural components.

In some embodiments, the insert is laterally insertable at one or more structural components.

In some embodiments, the insert is retained by the one or more structural components, wherein the retention resists separation between the insert and the one or more structural components.

In some embodiments, the insert is connectible to the hardware component at a channel in the insert.

According to an aspect, an assembly includes one or more structural components;
an insert insertable at the one or more structural components; a panel; and a hardware component connectible to the insert and to the panel to releasably secure the panel to the one or more structural components.

In some embodiments, the insert is insertable at the one or more structural components at one or more cavities each defined at a top surface of each of the one or more structural components, the insert having a top opening dimensioned to receive the hardware component.

In some embodiments, the insert is insertable at one of the one or more structural components at a cavity defined at a lateral surface of the structural component, the insert having an opening dimensioned to receive the hardware component.

In some embodiments, the insert is retained by the one or more structural components, wherein the retention resists separation between the insert and the one or more structural components, wherein the panel is secured to permit vibrational movement of the panel.

In some embodiments, the panel is directly contacting the one or more structural components but not directly contacting the insert.

In some embodiments, the panel is directly contacting the insert and not directly contacting the one or more structural components.

According to an aspect, a method for connecting a panel includes impeding vibration of the panel relative to an insert, the insert releasably connected to one or more structural components; and impeding vibration of the insert relative to the one or more structural components.

According to an aspect, a method for assembling an assembly for a panel includes inserting an insert into a cavity of one or more structural components; and releasably securing the panel to at least one of the one or more structural components at the insert using a hardware component.

Other aspects and features and combinations thereof concerning embodiments described herein will be become apparent to those ordinarily skilled in the art upon review of the instant disclosure of embodiments in conjunction with the accompanying figures.

DESCRIPTION OF THE DRAWINGS

In the figures, embodiments are illustrated by way of example. It is to be expressly understood that the description and figures are only for the purpose of illustration and as an aid to understanding. Embodiments will now be described, by way of example only, with reference to the attached figures, wherein in the figures.

DETAILED DESCRIPTION

Screening can refer to the separation of granular materials by size comparison between particle diameter and defined openings. Screening panels can be used to provide the defined openings in a screening machine in an arrangement of a flat panel with openings. Screening can be performed using relative motion between particle and screening panels. Vibrating screens can provide the means of motion by vibration in a direction that accelerates the particle against gravity and away from the screening panel and creates a particle throw.

The screening panel can be attached to structural support components in different ways. Some ways do not provide for the separation of the attachment from the rail when worn. Others can require special tools for replacement or involve welded connections directly between the attachment and rails. Others are limited in their capability to secure screening panels such that heavier screening panels or heavier particles can be incompatible with the attachment or the solution and can involve a change to the type of hardware or method.

In some embodiments, there is provided an insert that eliminates, mitigates, or reduces the effects of one or more of these disadvantages. Embodiments described herein provide a device to attach a screening panel to structural support components (e.g., rails) of a vibrating screen. A secure connection is provided to withstand the vibration as well as particle impact while allowing quick replacements of the screening panel, according to some embodiments. In some embodiments, worn attachment hardware can be replaced without having to replace the rails. The insert can be used without welded connections such as between the device and a structural support component. This can be beneficial and enable a stronger structural support as heat affected zones created by welding can otherwise reduce the allowable stress in the structural support components. The insert can be quickly assembled and disassembled with the most basic tools such as a hammer. In some embodiments, the insert provides a small replaceable part to address a small wear area while not having to replace larger structural components. The insert can also be used with many load requirements such as where heavy screening panels are used or large particles are in contact.

Figure 1:
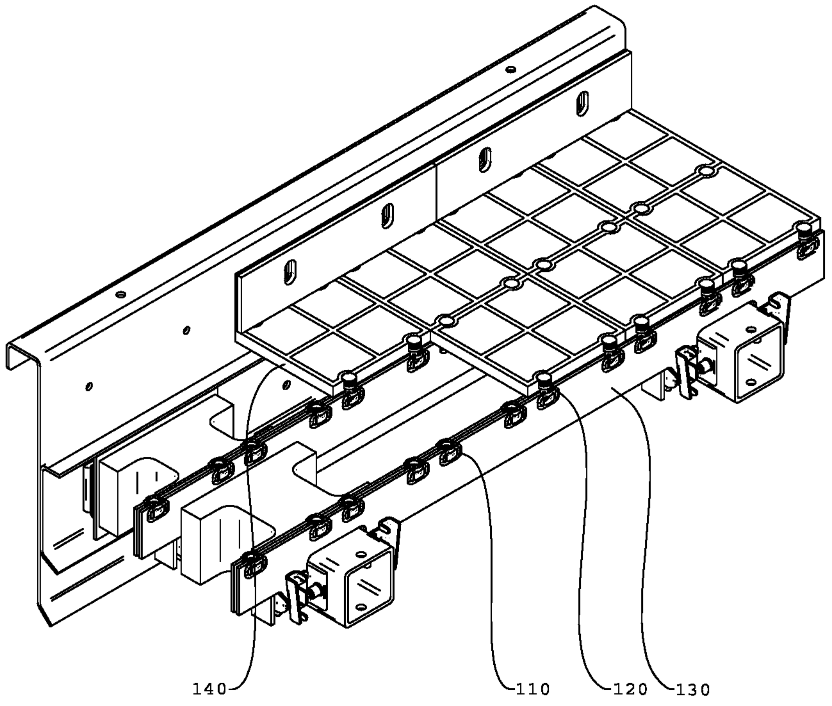
FIG. 1 is a schematic view of an installation of an insert, according to some embodiments.

FIG. 1 is a schematic view of an example installation of an insert 110 at a structural component 130 according to some embodiments. The structural component can be a rectangular steel tube or an elongated member having a different cross-sectional shape, for example. As shown, insert 110 connects with a portion of a structural component 130, such as a rail. In some embodiments, the connection is a releasable engagement. The connection can be along a top surface of the rail 130, the top surface being defined by a surface that is positioned to receive a screening panel 140.

In some embodiments, insert 110 connects with a portion of a structural component 130 along respective outer surfaces. This can form a tight fit or a fit that suitably permits sufficient engagement between insert 110 and structural component 130 or that suitably permits sufficient retention of insert 110 at structural component 130. In some embodiments, screening panel 140 contributes a locating effect to insert 110. For example, screening panel 140 can facilitate retention of insert 110 at structural component 130 by impeding lateral movement (e.g., shifting) of insert 110 at structural component 130. Screening panel 140 can be positioned to abut a portion of structural component 130 and/or insert 110 to impede lateral movement of insert 110 beyond a threshold amount.

As shown, hardware component 120 connects with insert 110. In some embodiments, the connection is a releasable engagement.

An example configuration of an example hardware component 120 with insert 110 according to some embodiments will now be described. A first end of hardware component 120 is inserted into an opening in the top surface of an insert 130. A second end of hardware component 120 connects with a portion of a screening panel 140. In some embodiments, the connection is a releasable engagement. Hardware component 120 connects with an outer edge of the portion of the screening panel 140 in some embodiments. Some hardware components 120 can connect with more than one portion of screening panels 140. For example, hardware component 120 can connect with an outer edge of a first portion of a screening panel 140, as well as an outer edge of a second portion of the screening panel 140, where the outer edge of the second portion abuts the outer edge of the first portion. This configuration can allow for a modular design or assembly of screening panels 140 on a structural component 130 such as a rail, in some embodiments.

More than one insert 110 can be spaced along the top surface of the rail 130. The spacing can be designed to accommodate corresponding spacings of hardware components 130 attached to screening panel 140, for example. The spacing is configured to provide a suitable level of stability and security between screening panel 140 and rail 130. For example, a pair of inserts 110 can be spaced apart from another pair of inserts 110 along a top surface of the rail 130, such that the distance between each insert 110 in each pair is less than the distance between an insert 110 in one pair and an insert 110 in a neighbouring pair. As another example, inserts 110 can be arranged at equal spacing along the rail 130. As another example, inserts 110 can be arranged at different spacings along the rail 130. Different arrangements of spacing between inserts are possible.

Figure 13:
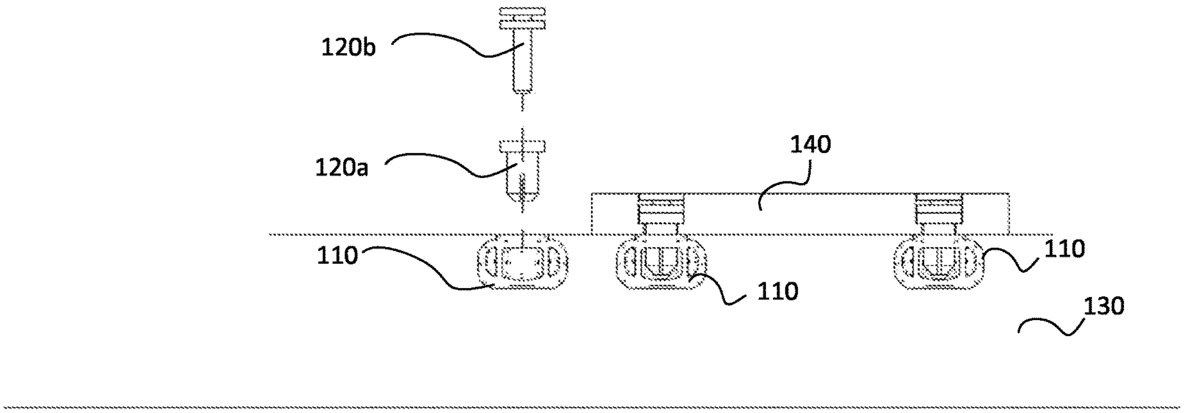
FIG. 13 is a lateral sectional schematic view of an installation of an insert, according to some embodiments.

In some embodiments, insert 110 is connectable to a panel 140, the insert 110 laterally insertable at the structural component 130, the insert 110 sized and dimensioned to receive a hardware component 120, the hardware component 120 configured to secure the panel 140 to the structural component 130. The insert 110 receives the hardware component 120 at the structural component 130. The hardware component 120 is engageable with the panel 140, and the insert 110 is insertable into the structural component 130. For example, in sequence, insert 110 is installed into the structural component 130 (e.g., a rail), panel 140 is placed on top of the structural component 130 such as over insert 110, and the hardware component 120 is applied to the installation, such as to secure the panel 140 to the structural component 130 at the insert 110. Screening panel 140 can be attached to a rail 130 in this manner according to some embodiments. In some embodiments, no additional hardware is required to secure insert 110 or to secure panel 140 to structural component 130. FIG. 13 shows an example installation of insert 110 at a structural component 130 with a panel 140 secured to structural component 130 at insert 110 using hardware component 120*a*, 120*b*.

In some embodiments, engagement of insert 110 with structural component 130 is by lateral insertion of insert 110 at or near a top surface (e.g., top edge) of structural component 130 (e.g., a rail), lateral being relative to a surface of structural component 130 that is configured to receive screening panel 140. For example, insert 110 is inserted into the side of a rail 130, while screening panel 140 is positioned to rest on the top of the rail 130, or on the top of insert 110 and near the top of the rail 130. Hardware component 120 is engageable with insert 110 and screening panel 140 and secures screening panel 140 to insert 110 and/or to structural component 130.

Structural component 130 can be a rail having a flat surface with a defined contour. The defined contour can be referred to as a cavity. Additional fabrication steps such as forming or welding are not required to provide the contour for the cavity. Insert 110 can be inserted into the cavity in structural component 130.

In some embodiments, insert 110 is not inserted along a vertical axis into structural component 130, the vertical axis extending through a top and bottom surface of structural component 130, the top surface being configured to receive a screening panel 140 (e.g., by direct contact or by indirect contact via insert 110).

For example, the axis of installation of insert 110 is not parallel to a plane defined by a lateral surface of structural component 130. Insert 110 is installed into a lateral surface of structural component 130. The angle of insertion can be perpendicular or transverse (e.g., sideways) to the lateral surface. Important is that the axis of installation of the insert is not parallel to the plane defined by the largest surface of rail 130.

In some embodiments, installation is completed in sequence by first installing insert 110 into structural component 130 (e.g., by lateral insertion), positioning screening panel 140 at or near a surface of rail 130, and installing hardware component 120. Hardware component 120 can be a single piece or multiple pieces. Hardware component 120 can facilitate engagement of screening panel 140 with insert 110 by insertion through insert 110 and through or near one or more screening panels 140 (e.g., at a junction between two or more screening panels 140). Hardware component 120 can be detachable from screening panel 140 or can be a fastening element integrated with screening panel 140 (e.g., forming an integrated piece with screening panel 140). For example, hardware component 120 can be a pin with barbs or similar.

Figure 2:
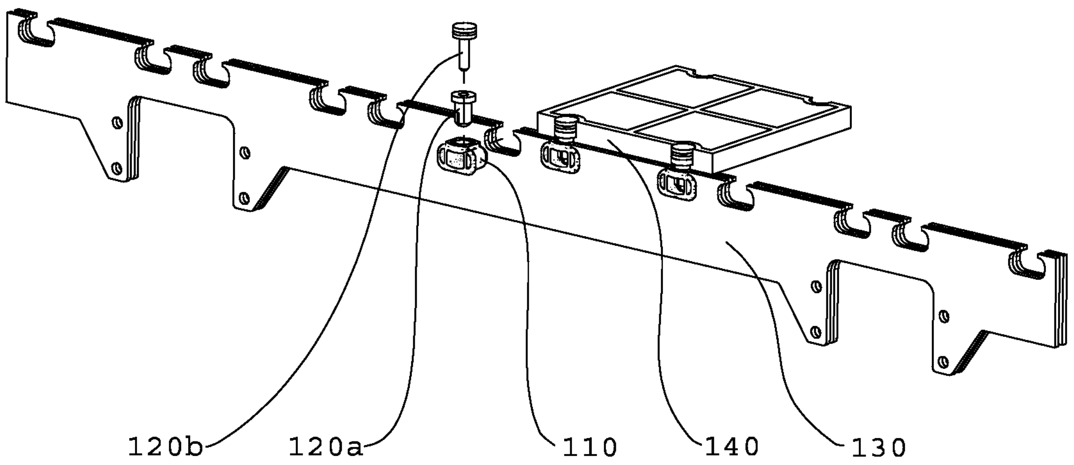
FIG. 2 is a schematic view of an installation of an insert, according to some embodiments.

FIG. 2 is an enlarged schematic diagram of an example installation of an insert 110 at a structural component 130 according to some embodiments. As shown, insert 110 is inserted into a cavity in a portion of a structural component 130 (e.g., a rail). As shown, the cavity is defined by an edge or at the top surface of the structural component 130. The insertion can be performed by insertion in a direction lateral to the structural component 130. The cavity is sized and dimensioned to receive the insert 110 and form a fit suitable for securing insert 110 to the rail 130. The fit can restrict movement of insert 110 during vibrational movement in use. Insert 110 can be inserted into the cavity by force along an axis parallel to a plane defined by a screening panel 140 attachable to the surface of the structural component 130, such as the top surface, where the plane defined by the screening panel extends along points of engagement between the screening panel 140 and the structural component 130. These points of engagement can be substantially at or near the top surfaces of the structural component 130, for example. The force can be easily applied using accessible tools such as a hammer. For example, insert 110 is laterally press fitted into structural component 130 (e.g., a rail) in some embodiments. Insert 110 can be attached to the one or more structural components 130 by press fitting; using mechanical means or locking, such as barbs, wedges, or screw threads; or other similar attachment methods or mechanisms. In some embodiments, the connection between structural component 130 and insert 110 is a releasable engagement (e.g., a releasable attachment). In some embodiments, screening panel 140 is engaged with structural component 130 via insert 110 at or near a top surface (e.g., top edge) of structural component 130.

In some embodiments, structural component 130 defines a cavity for receiving insert 110, where the cavity is defined in a surface other than at the top surface of the structural component 130. For example, the cavity can be an opening in one or both lateral sides of the structural component 130. An opening in each of the lateral sides of the structural component 130 can form a contiguous channel or can form separate openings. On installation, insert 110 is inserted into the cavity and retained in the cavity. In some embodiments, insert 110 is inserted into a cavity forming a contiguous channel and retained in the contiguous channel. In some embodiments, insert 110 can comprise a first piece that is inserted into a first opening in a first lateral side of structural component 130, as well as a second piece that is inserted into a second opening in a second lateral side of structural component 130. Screening panel 140 is positioned at or near a top surface of structural component 130. Hardware component 120 is installed at insert 110 to secure screening panel 140 to structural component 130. For example, hardware component 120 can engage with insert 110 at the opening in one or both lateral sides of structural component 130.

Screening panel 140 attachable to a surface of structural component 130 can be attached to structural component 130 involving direct contact with structural component 130 or not involving direct contact with structural component 130. In various embodiments, screening panel 140 directly contacts structural component 130, directly contacts insert 110, or both.

Figure 3A:
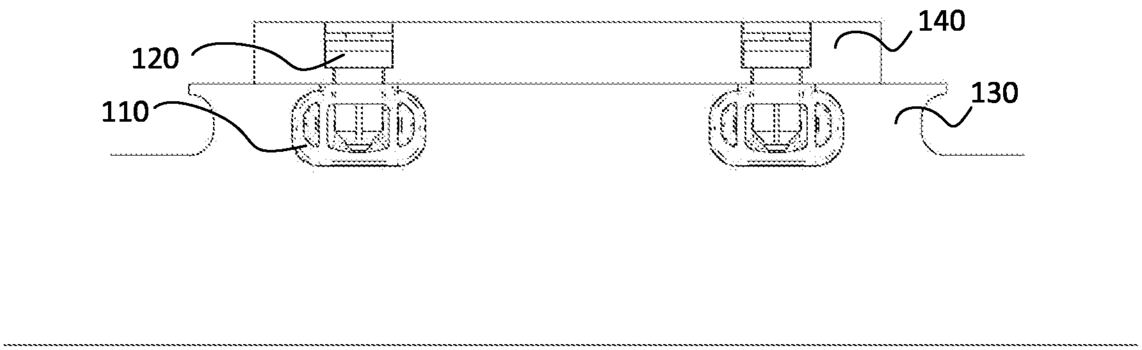
FIGS. 3A and 3B are lateral sectional schematic views of an installation of an insert, according to some embodiments.

In some embodiments, screening panel 140 is attachable to structural component 130 and directly contacts (e.g., abuts) structural component 130. For example, as shown in FIG. 3A, a bottom surface of screening panel 140 can abut a top surface of structural component 130, such as at the top edge of a rail. Screening panel 140 can rest on structural component 130. Insert 110 is engageable with screening panel 140 and attaches screening panel 140 to structural component 130. In some embodiments, upon installation, a top surface of insert 110 is flush with a top surface of structural component 130. For example, insert 110 is aligned with a top edge of rail 130.

Figure 3B:
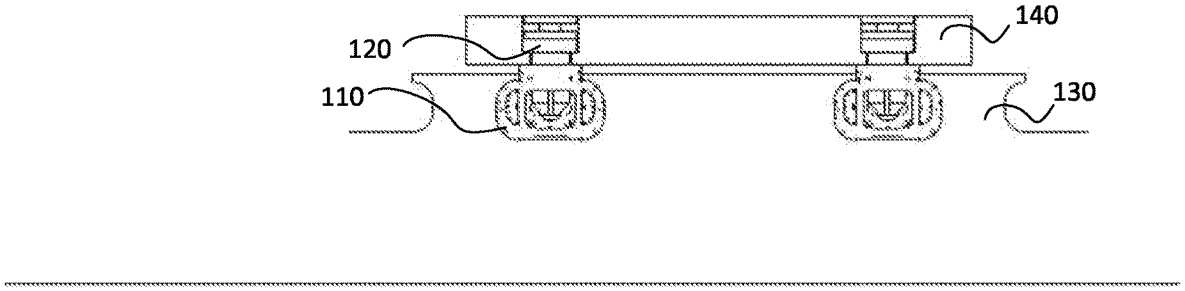

In some embodiments, screening panel 140 is attachable to structural component 130 and does not directly contact structural component 130. For example, as shown in FIG. 3B, screening panel 140 can contact insert 110 and insert 110 can contact structural component 130, where structural component 130 does not directly contact screening panel 140. In particular, as shown, insert 110 extends (e.g., protrudes) above the top surface (e.g., edge of the rail) or other surface (e.g., side surface) of the structural component and engages with screening panel 140. Screening panel 140 can rest on insert 110 without directly contacting structural component 130, for example.

In some embodiments, screening panel 140 contacts structural component 130 and is secured to structural component 130 using insert 110 without directly contacting insert 110. For example, screening panel 140 can be positioned to abut structural component 130 at a top surface (e.g., an edge) of structural component 130 and positioned above a cavity defined by the top surface, without abutting the cavity. The cavity can receive insert 110, insert 110 can be retained in the cavity and extend upwards to a position below a top surface (e.g., a top surface at a neighbouring position along the structural component 130) of structural component 130. Hardware component 120 can engage with both insert 110 and screening panel 140 and secure screening panel 140 to structural component 130 at insert 110, without screening panel 140 directly contacting insert 110.

In some embodiments, insert 110 is used as a receptacle for hardware component 120 that can be used to secure screen panel 140 to structural component 130. Small relative movements between insert 110 and hardware component 120 can result in wear that can degrade hardware component 120. Insert 110 can be subject to wear where any one or more of structural component 130, insert 110, hardware component 120, or screening panel 140 are momentarily separated from each other during relative movement. For example, in some embodiments if screening panel 140 is in contact with structural component 130 while attached, screening panel 140 can lose contact with structural component 130 momentarily such as during vibration. As another example, in some embodiments, adjacent structural components 130 are momentarily separated from each other and permit relative movement such as vibrational movement. As another example, in some embodiments, adjacent structural components 130 are positioned relative to each other such that a separation (e.g., gap) exists between the adjacent structural components 130 and permit relative movement such as vibrational movement. In some embodiments, some structural components 130 are positioned to maintain a separation from one or more other structural components 130, while configured to abut one or more other structural components 130 and/or permit momentary separation from one or more other structural components 130. Insert 110 and structural component 130 can be configured to resist or impede separation where insert 110 is retained in a cavity in structural component 130, while separation between structural component 130 and screen panel 140 and/or between structural component 130 and an adjacent structural component 130 occurs.

In some embodiments, insert 110 is easily assembled or disassembled from hardware component 120 and/or structural component 130. In some embodiments, hardware component 120 is easily assembled or disassembled from insert 110 and/or screening panel 140. For example, hardware component 120 can be replaced after wear by removing the worn hardware component 120 without also replacing or disassembling the structural component 130 or any portion of same and/or without also replacing or disassembling insert 110 from structural component 130. In some embodiments, hardware component 120 can be replaced by removing both the hardware component 120 as well as an insert 110 that the hardware component 120 is engaged with, but without replacing any portion of structural component 130. This can allow for easier and more cost-effective replacement of only the hardware component 120 or only the hardware component 120 and insert 110, instead of also a portion of a rail, for example. Similarly, an insert 110 can be replaced after wear by removing the worn insert 110 without also replacing or disassembling the portion of the structural component 130 that insert 110 is engaged with. A portion of screening panel 140 can be easily disengaged from structural component 130 without replacing or disassembling any portion of the structural component 130, such as by disengaging the portion of the screening panel 140 from a connected hardware component 120 or disengaging the portion of the screening panel 130 together with a connected hardware component 120 and/or a connected insert 110 from the structural component 130. In various embodiments, all or only select components of each kind (e.g., structural component 130, insert 110, hardware component 120) can be replaced.

Insert 110 is shaped and configured to be retained in the cavity of the structural component 130. In some embodiments, for example, insert 110 is a member having a channel defined along the axis of its insertion into structural component 130. Insert 110 can form a tube, for example. The cross-sectional shape of the tube can be rectangular, polygonal, oblong, elliptical, cylindrical, or other shape, where the cross-section is taken along an axis substantially orthogonal to the axis defined by the channel.

In some embodiments, insert 110 does not have a channel, but has an opening at one or two ends of the insert 110 along the same axis (e.g., side opening(s)). In some embodiments, the channel or the opening(s) at one or two ends of the insert 110 can facilitate release (e.g., ejection) of broken pieces of hardware component 120 such as during replacement of hardware component 120 or insert 110.

In some embodiments, insert 110 has an opening defined in its top surface, the opening sized and dimensioned to receive a hardware component 120.

In some embodiments, insert 110 neither has the channel nor side openings, but has an opening defined in its top surface. The opening defined in its top surface can be sized and dimensioned to receive a hardware component and secure a screening panel 140 to structural component 130. An opening can also refer to an opening of the channel or either of the side openings.

In some embodiments, insert 110 is engaged with structural component 130 without welding. Insert 110 is inserted laterally into structural component 130, relative to the positioning of screening panel 140 attachable to structural component 130. In some embodiments, this can facilitate assembly and disassembly or replacement of insert 110, such as without replacing any portion of structural component 130. In some embodiments, this can also allow screening panels 140 to be engaged with structural component 130 and/or replaced or disassembled more easily and without subjecting any component to the high temperatures of welding that can weaken or structurally deteriorate the assembly or attachment.

Figure 4A:
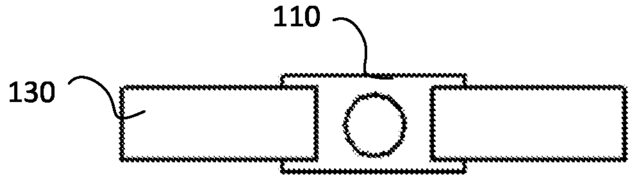
FIGS. 4A, 4B, and 4C are top schematic views of an installation of an insert, according to some embodiments.
Figure 4B:
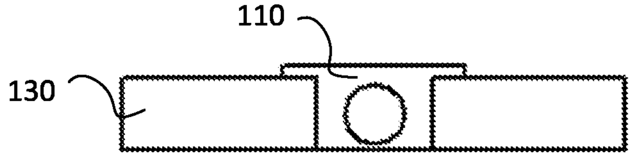
Figure 4C:
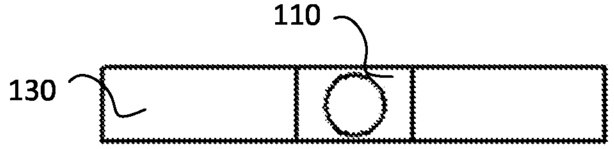
Figure 5A:
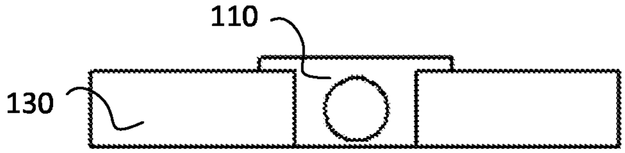
FIGS. 5A, 5B, and 5C are top schematic views of an installation of an insert, according to some embodiments.
Figure 5B:
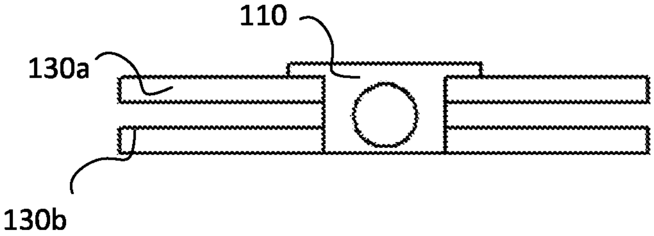
Figure 5C:
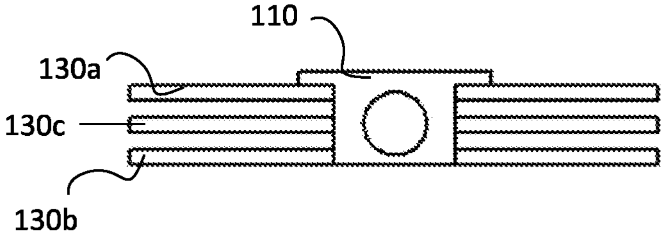

FIGS. 4A, 4B, and 4C are top schematic views of insert 110 retained by structural component 130. Insert 110 can be inserted laterally into structural component 130 and be retained by structural component 130, while insert 110 protrudes laterally from both sides of structural component 130 (as shown in embodiments illustrated in FIG. 4A), while insert 110 protrudes laterally from one side of structural component 130 (as shown in embodiments illustrated in FIG. 4B), or while insert 110 does not protrude laterally from any lateral side of structural component 130 (as shown in embodiments illustrated in FIG. 4C). Such configuration can also exist with other embodiments of insert 110 installed at more than one structural component 130 (e.g., 130*a*, 130*b*, 130*c*, etc.). For example, FIGS. 5A, 5B, and 5C show an example insert 110 protruding laterally from one lateral side of one structural component 130. Insert 110 can be sized and dimensioned to have a greater width, the same width, or a different width than the width of structural component 130 along the same axis, measured when insert 110 is retained by structural component 130.

In some embodiments, insert 110 is configured for installation at one or more structural components 130. For example, insert 110 can be laterally inserted into a lateral side of one or more adjacent structural components 130

(e.g., parallel rails) and simultaneously retained (e.g., in respective cavities) by each of the one or more structural components 130. FIGS. 5A, 5B, and 5C are top schematic views of insert 110 installed at structural component 130. FIG. 5A shows insert 110 installed at a single structural component 130, FIG. 5B shows insert 110 installed at two structural components 130*a* and 130*b*, and FIG. 5C shows insert 110 installed at three structural components 130*a*, 130*b*, and 130*c*. Insert 110 can be installed at additional numbers of structural components. Insert 110 is configured to engage with screening panel 140 (e.g., directly or indirectly; with direct contact or without direct contact) and can secure screening panel 140 to each of the one or more structural components 130 that insert 110 is inserted into. For example, insert 110 can receive hardware component 120 at a top opening of insert 110 and hardware component 120 can secure screening panel 140 to the one or more structural components 130. The one or more structural components 130 can be aligned such that corresponding cavities defined in a surface of structural component 130 are aligned to form a channel through which insert 110 can be received.

FIGS. 7, 8, 9, 10, 11, and 12 are top schematic views of an installation of example inserts 110, according to some embodiments. These figures show examples of different installations and/or configurations of insert 110. A structural component 130 (or 130*a*, 130*b*, 130*c*, etc.) can abut adjacent structural component(s) 130 (or 130*a*, 130*b*, 130*c*, etc.) or can be separated by a distance, for example. Different inserts 110 can have different structural features such as lower portions extending beyond an outer surface of a structural component 130 and/or other lower portions not extending beyond outer surface of a structural component 130.

In some embodiments, insert 110 has an opening defined in its top surface, the top surface defining a plane that is substantially parallel to a plane defined by the axis defined by the channel or a plane defined by the top surface of a screening panel 140 attached to the structural component 130. The top surface of the insert 110 faces or opposes a surface of the screening panel 140 where the screening panel 140 is secured to the structural component 130. The opening of insert 110 is sized and dimensioned to receive hardware component 120, for example.

On assembly, insert 110 is inserted into the structural component 130 such as in a cavity defined by the top surface (e.g., a top edge) of the structural component 130. In some embodiments, hardware component 120 is comprised of a first portion 120*a* that is inserted into the opening of insert 110 and a second portion 120*b*. First portion 120*a* is an elongated member with one end retained in the channel of insert 110 upon insertion into the opening of insert 110. First portion 120*a* can have a lip at a second end to facilitate the retention of first portion 120*a* in insert 110 and/or to facilitate engagement with a portion of screening panel 140. The second end, for example, at the lip, can have an opening sized and dimensioned to receive the second portion 120*b* of hardware component 120. This opening can define a channel that extends along the axis of first portion 120*a* towards the first end of the first portion 120*a*.

In some embodiments, second portion 120*b* is an elongated member sized and dimensioned for insertion into the opening at the second end of first portion 120*a*. Second portion 120*b* has a first end that is retained in a channel of the first portion 120*a*. Second portion 120*b* can have a lip at a second end. On assembly of some embodiments, upon insertion of hardware component 120 into insert 110, hardware component 120 and insert 110 form a fit suitable for securing hardware component 130 and/or screening panel 140 to insert 110 while permitting vibrational movement between insert 110 and either or both hardware component and screening panel 140.

In some embodiments, there is provided an assembly and method including releasably connecting the insert 110 to the structural component 130 and releasably connecting the hardware component 120 to the insert, where the hardware component 120 does not directly engage with the structural component 130.

In some embodiments, hardware component 120 is inserted into insert 110. This can direct any wear (e.g., from vibrations of screening panel 14) during use to insert 110 rather than structural component 130. Insert 110 can be detached or released from structural component 130 and replaced, without replacing or disassembling any portion of structural component 130 engaged with insert 110.

On assembly of some embodiments, upon insertion of insert 110 into the structural component 120 (e.g., a portion of a rail), positioning of screening panel 140 at or near structural component 120 (e.g., abutting a surface of structural component 120; at a distance above a top surface of structural component 120 and abutting insert 110 such as if insert 110 extends a distance above structural component 120 as shown in FIG. 3B; etc., insertion of first portion 120*a* into the opening of insert 110 and engagement with structural component 120, and insertion of second portion 120*b* into the opening of first portion 120*a* and engagement with structural component 120, the respective lips of first portion 120*a* and first portion 120*b* can form a head portion of hardware component 120 that extends above the top surface of the structural component 130. A portion of a screening panel 140 can engage with the head portion of hardware component 120. For example, an edge surface of the portion of the screening panel 140 can have an indent sized and dimensioned to receive a portion of the head in a tight fit, for example, alone or when abutting an edge surface of a second portion of the screening panel 140. One or more additional portions of the screening panel 140 can be assembled, with each portion or piece each having one or more edge surfaces each abutting one or more edge surfaces of a neighbouring portion of the screening panel 140.

Hardware component 120 can be arranged at inserts 110 to secure these portions of the screening panel 140 with portions of the structural component 130 at one or more of these edge surfaces of these portions of screening panel 140. Inserts 110 can be correspondingly arranged along portions of the structural component 130 to receive corresponding hardware components 120.

As an example, as shown in FIG. 1, a first portion of a screening panel 140 is a square-shaped frame sized to extend from an outer edge of a rail to a first inner rail component. Inserts 110 can be inserted laterally at or near the top surface of the first inner rail component and each receive hardware components 120. Each of the hardware components 120 at a portion of the surface of its head can connect with the first portion of the screening panel 140 along an outer edge surface of the first portion of the screening panel 140. Another portion of the surface of the head of each hardware component 120 can connect with a second portion of the screening panel 140 arranged to abut the surface of the first portion of the screening panel 140 as shown. The second portion of the screening panel 140 can be arranged to extend along the same axis as the first portion of the screening panel 140 and to a second inner rail component. Inserts 110 can be inserted into the top surface of the second inner rail component and each receive hardware components 120. The hardware components 120 can connect with the second portion of the screening panel 140 along an outer edge surface of the first portion of the screening panel 140. This arrangement can secure one or more portions of a screening panel 140 to a structural component 130 The second inner rail component second portion 120*b* into first portion 110*a*, hardware component 120.

According to some embodiments, insert 110 coupled with hardware component 120 provides a secure attachment of the screening panel 140 to the rail 130, while permitting the screening panel 140 to vibrate along one or more axes as well as withstand impact of any particles such as particles interacting with screening panel 140. For example, the direction of vibration of screening panel 140 can be two dimensional, such as along a first axis defined by a surface of screening panel 140 (e.g., largest surface, top surface) and along a second axis that is perpendicular to the first axis. The first axis can be in the direction of an influx of material (e.g., particulate matter) to the screening panel 140 for separation by the screening panel 140. For example, screening panel 140 can move (e.g., vibrate) up and down, as well as back and forth along a longitudinal axis defined by the flow of material. In some embodiments, one or more structural components 130 (e.g., rails) are installed along the longitudinal axis (e.g., with the flow of material and in plane with a direction of vibration of screening panel 130). In some embodiments, one or more structural components 130 (e.g., rails) are installed laterally relative to a direction of vibration of screening panel 130 (e.g., perpendicularly to a direction of vibration of screening panel 130).

Figure 6A:
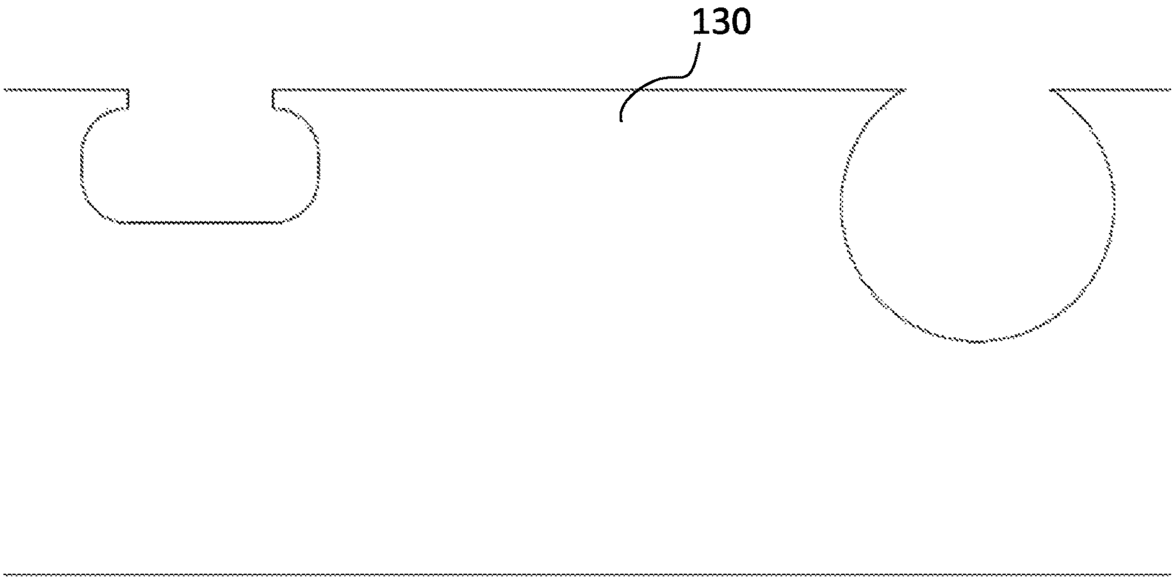
FIGS. 6A, 6B, and 6C are lateral sectional schematic views of a structural component for installation of an insert, according to some embodiments.
Figure 6B:
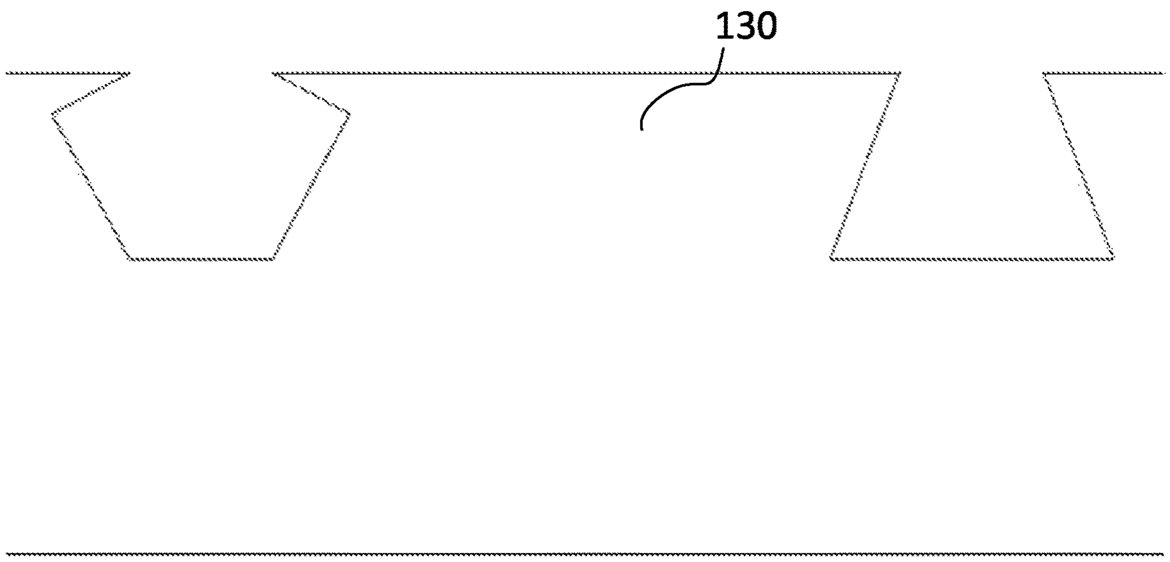
Figure 6C:
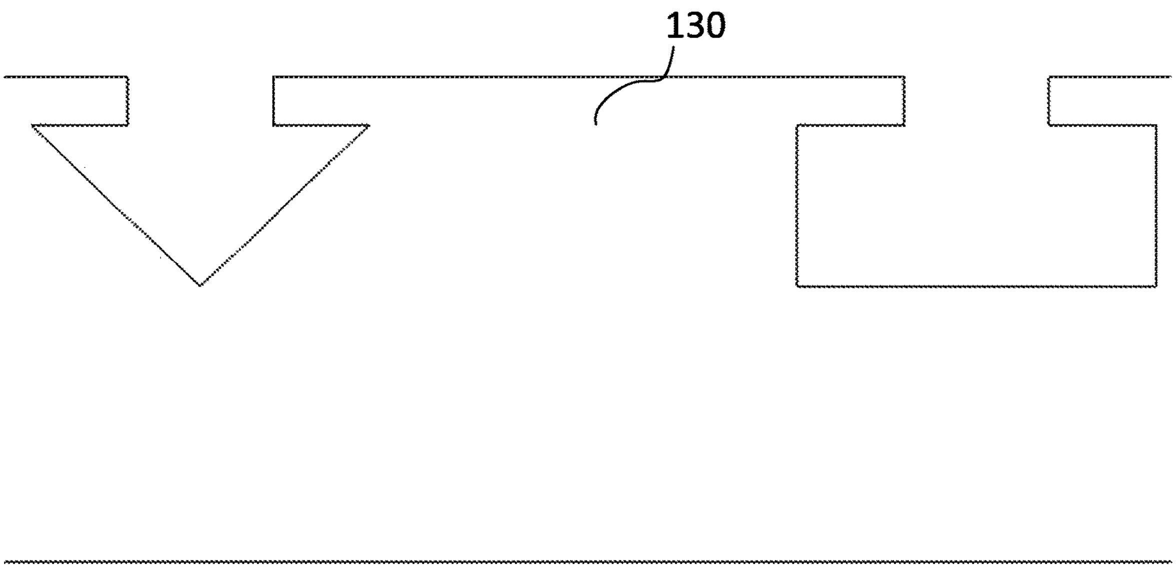
Figure 7:
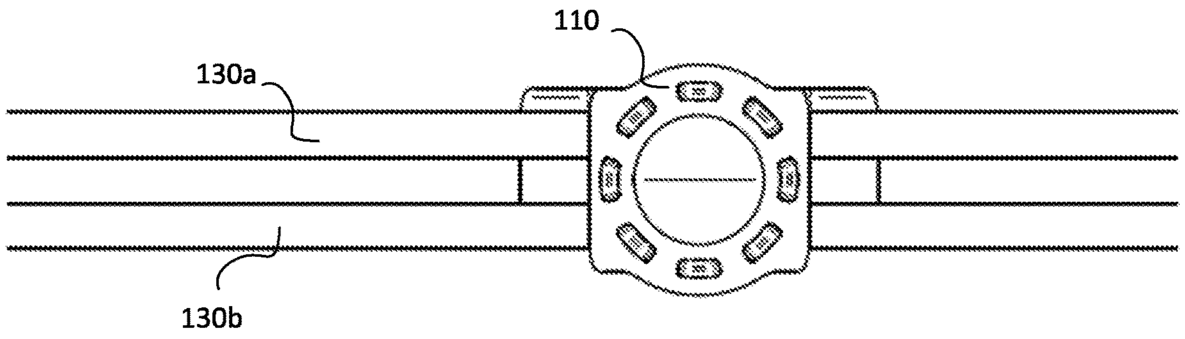
FIG. 7 is a top schematic view of an installation of an insert, according to some embodiments.
Figure 8:
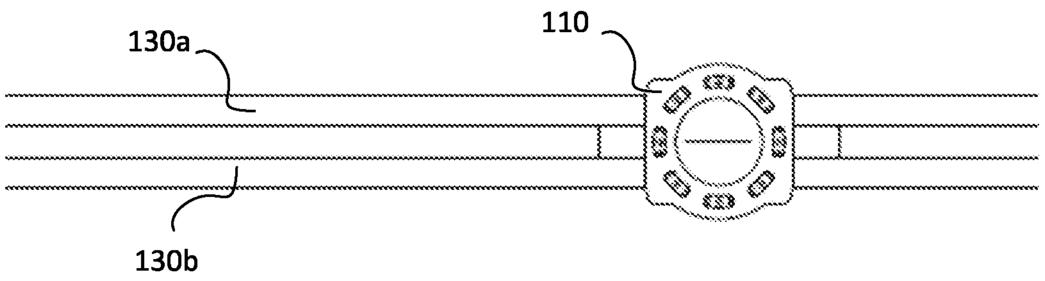
FIG. 8 is a top schematic view of an installation of an insert, according to some embodiments.
Figure 9:
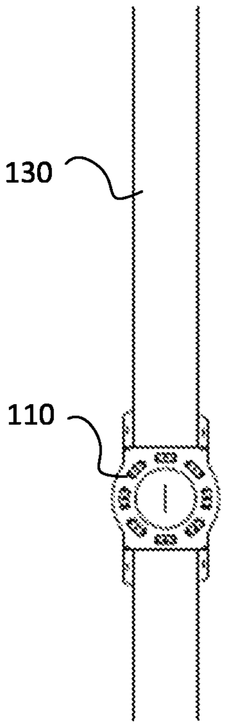
FIG. 9 is a top schematic view of an installation of an insert, according to some embodiments.
Figure 10:
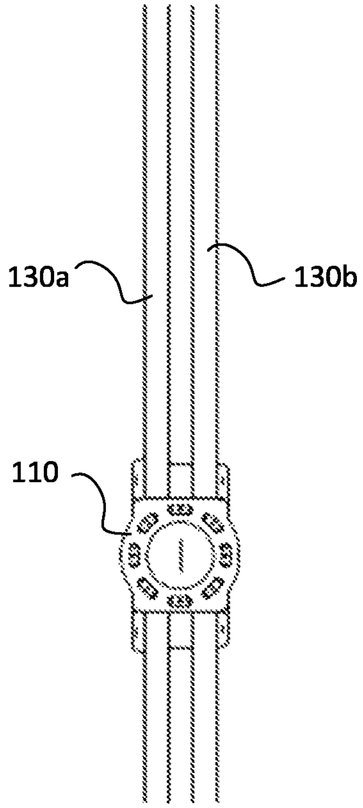
FIG. 10 is a top schematic view of an installation of an insert, according to some embodiments.
Figure 11:
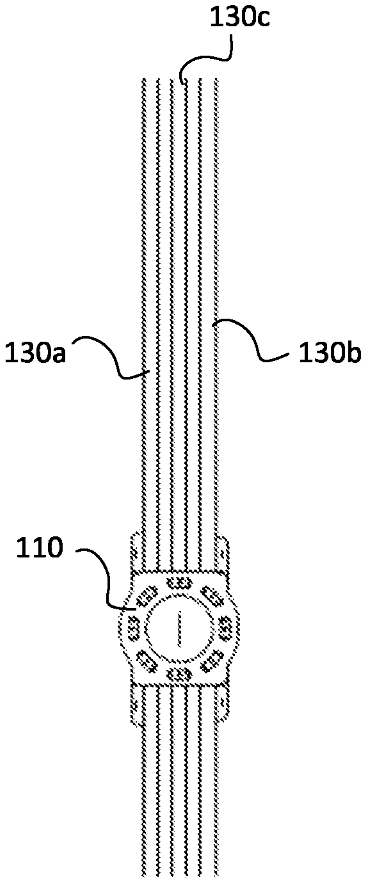
FIG. 11 is a top schematic view of an installation of an insert, according to some embodiments.
Figure 12:
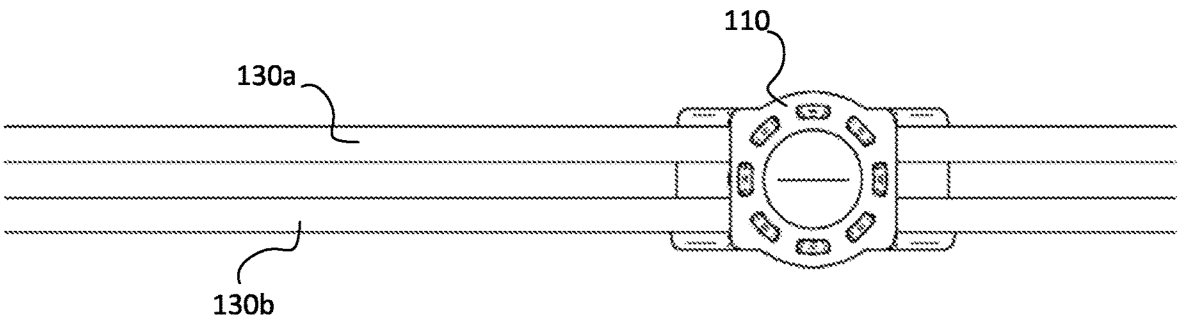
FIG. 12 is a top schematic view of an installation of an insert, according to some embodiments.

In some embodiments, various components, including insert 110, hardware component 120, rail 130, screening panel 140, and any portion or component of same, are configured, sized, dimensioned, shaped, and/or oriented differently. For example, components can be circular, cylindrical, rectangular, polygonal, elliptical, oblong, or differently shaped or have these cross-sectional shapes. As examples, FIGS. 6A, 6B, and 6C are lateral side schematic views of different embodiments of structural component 130. Each of FIGS. 6A, 6B, and 6C depict various cavity shapes defined by a top surface (e.g., edge) of structural component 130. Cavity shapes can be different in a single structural component 130, as shown, or can be the same in a single structural component 130. The various components can be adjusted correspondingly to allow each component to be operable with corresponding components.

Throughout this description, a top surface of structural component 130 can refer to an edge of structural component 130. Throughout this description, in some embodiments, a top surface of structural component 130 can instead be another surface of structural component 130. In some embodiments, screening panel 140 is attachable to another surface of structural component 130 such as a bottom surface of structural component 130. For example, insert 110 is installed by lateral insertion into structural component 130 at a cavity defined by a surface (e.g., a bottom surface, a bottom edge) of structural component 130. Screening panel 140 is positioned at or near that surface (e.g., the bottom surface) of structural component 130. Hardware component 120 is installed at insert 110 and screening panel 140. Hardware component 120 can maintain an attachment between screening panel 140 and structural component 130 such as described herein (e.g., in relation to FIGS. 3A and 3B) but modified to accommodate the relative configuration of the surface of structural component 130 to the other components. Other functionality and configurations are as described herein but modified to accommodate this relative configuration.

Throughout this description, screening panel 140 can refer to a panel 140. A hardware component can refer to one or more hardware components.

The following description relates to further example embodiments.

In some embodiments, a device includes an insert 110 insertable at one or more structural components 130, the insert 110 connectible to a hardware component 120, the hardware component 120 connectible to a panel 140 to releasably secure the panel 140 to at least one of the one or more structural components 130. The panel 140 can be released from the hardware component 120 in order to replace hardware component 120 and/or insert 110 without replacing panel 140. Insert 110 can also be removed from the one or more structural components 130 in order to replace insert 110 without replacing the one or more structural components 130 or vice versa. Insert 110 has a top opening dimensioned to receive the hardware component 120. Insert 110 is configured to be releasably retained at a top surface of the one or more structural components 130. Insert 110 can be inserted at one structural component 130 (e.g., as shown in the embodiment shown in FIG. 5A) or more than one (e.g., as shown in the embodiment shown in FIG. 5B).

In some embodiments, insert 110 protrudes from at least one lateral surface of at least one of the one or more structural components (e.g., as shown in the embodiments shown in FIG. 4A and FIG. 4B).

Insert 110 is insertable at the one or more structural components 130 at one or more cavities each defined at a top surface of each of the one or more structural components 130 (e.g., as shown in the embodiment shown in FIG. 3B), insert 110 having a top opening dimensioned to receive hardware component 120. In some embodiments, the top opening is flush with the top surface of each of the one or more structural components (e.g., as shown in the embodiment shown in FIG. 13). In some embodiments, the top opening is not flush with the top surface of each of the one or more structural components 130 (e.g., as shown in the embodiment shown in FIG. 3B).

In some embodiments, an insert is insertable at one of the one or more structural components 130 at a cavity defined at a lateral surface of the structural component 130, the insert having an opening dimensioned to receive the hardware component 120. Another similar insert can be inserted at a cavity defined at another lateral surface of the same structural component 130, such that an insert protrudes from left and right lateral surfaces of a structural component 130, according to some embodiments. A hardware component (including more than one hardware components) can be releasably secured to each insert, as well as releasably secure a panel 140 to the structural component 130.

In some embodiments, the opening of insert 110 is a top opening.

In some embodiments, insert 110 is releasably engaged with the one or more structural components 130.

In some embodiments, insert 110 is laterally insertable at one or more structural components 130.

In some embodiments, insert 110 is retained by the one or more structural components 130, wherein the retention resists separation between the insert and the one or more structural components. This can be due to the nature of the retention, such as retention by press fitting insert 110 into the one or more structural components 130 at a cavity complementary to insert 110 and that provides a tight fit. Retention can be achieved by press fitting; using mechanical means or locking, such as barbs, wedges, or screw threads; or other similar attachment methods or mechanisms.

In some embodiments, insert 110 is connectible to hardware component 120 at a channel in the insert 110. The top opening is the opening in this channel, according to these embodiments.

In some embodiments, an assembly includes one or more structural components 130; an insert 110 insertable at the one or more structural components 130; a panel 140; and a hardware component 120 connectible to the insert 110 and to the panel 140 to releasably secure the panel 140 to the one or more structural components 130.

In some embodiments of the assembly, insert 110 is insertable at the one or more structural components 130 at one or more cavities each defined at a top surface of each of the one or more structural components 130, the insert 110 having a top opening dimensioned to receive the hardware component 120.

In some embodiments of the assembly, insert 110 is insertable at one of the one or more structural components 130 at a cavity defined at a lateral surface of the structural component 130, the insert 110 having an opening dimensioned to receive the hardware component 120.

In some embodiments, hardware component 120 can attach to a variety of surfaces of insert 110.

In some embodiments of the assembly, insert 110 is retained by the one or more structural components 130, where the retention resists separation between the insert 110 and the one or more structural components 130 and where the panel 140 is secured to permit vibrational movement of the panel 140. Panel 140 can vibrate along one or more different axes such as up and down or left and right relative to one or more of the structural components 130 and/or relative to hardware component 120 and/or relative to insert 110.

According to some embodiments, the one or more structural components 130, insert 110, hardware 120 and panel 140 are all components of a vibrating screen assembly. The assembly can vibrate while movement of one or more or all of these components relative to each other is impeded (e.g., reduced, minimized). Each of the components can be comprised of flexible materials (e.g., steel, plastic, etc.) and some residual movement of component(s) relative to each other may be possible. The assembly assembled as described herein can help impede this movement and, in turn, impede (e.g., reduce, minimize) wear. For example, vibration of panel 140 relative to insert 110 can be impeded and/or vibration of insert 110 relative to the one or more structural components 130 can be impeded. Material (e.g., sand, gravel, ore, etc.) may be transported over the entire assembly and can cause wear by material movement on the outer surfaces. Insert 110 facilitates secure attachment such as between panel 140 and one or more structural components 130 while still being relatively easily replaced, such as after an unacceptable level of wear has occurred.

In some embodiments of the assembly, the panel 120 directly contacts the one or more structural components 130 but does not directly contacting the insert 110. For example, panel 120 can directly contact hardware component 120.

In some embodiments of the assembly, the panel 120 directly contacts the insert 110 and does not directly contact the one or more structural components 130.

In some embodiments, a method for managing vibrational wear includes impeding vibration of a panel 140 relative to an insert 110, the insert 110 releasably connected to one or more structural components 130; and impeding vibration of the insert 110 relative to the one or more structural components 130. The impeding can be provided by the nature of the retention of insert 110 at the structural component(s) 130, such as arising from a press fit connection. There can be a separation between the panel 140 and the structural component(s) 130 arising from hardware component 120 and/or insert 110 protruding above a top surface of structural component(s) 130. This can reduce wear on structural component(s) 130.

In some embodiments, a method for assembling an assembly for managing wear includes inserting an insert 110 into a cavity of one or more structural components 130; and releasably securing a panel 140 to at least one of the one or more structural components 130 at the insert 110 using a hardware component 120. Insert 110 can be attached to the one or more structural components 130 by press fitting; using mechanical means or locking, such as barbs, wedges, or screw threads; or other similar attachment methods or mechanisms.

In some embodiments, the assembly provides a secure and releasable connection between panel 140 and one or more structural components 130 while panel 140 is subjected to force. The whole assembly may be stationary or vibrate as a whole or move any other way as a whole. Insert 110 can facilitate a connection between panel 140 and the one or more structural components 130 in a secure manner that is not unduly affected by force or wear.

The discussion herein provides example embodiments of the technology. The technology is considered to include all possible combinations of the disclosed elements. Accordingly, if one embodiment comprises elements A, B, and C and a second embodiment comprises elements B and D, then embodiments of the technology are contemplated to also comprise elements A, B, C, and D, as well as other remaining combinations of A, B, C, or D, even if not explicitly disclosed.

Although various embodiments have been described in detail, it should be understood that various changes, substitutions, and alterations can be made herein. Moreover, the scope of the present application is not intended to be limited to the particular embodiments of the process, machine, manufacture, composition of matter, means, methods and steps described in the specification.

As can be understood, the examples described herein and illustrated are intended to be exemplary only.

What is claimed is:

1. A device, comprising:

flexible insert laterally insertable at one or more structural components, the insert connectible to a hardware component, the hardware component connectible to a panel to releasably secure the panel to at least one of the one or more structural components, the panel movable at the flexible insert relative to at least one of the one or more structural components.

2. The device of claim 1, the insert having a top opening dimensioned to receive the hardware component.

3. The device of claim 1, the insert configured to be releasably retained at a top surface of the one or more structural components.

4. The device of claim 1, the insert protruding from at least one lateral surface of at least one of the one or more structural components.

5. The device of claim 1, the insert insertable at the one or more structural components at one or more cavities each defined at a top surface of each of the one or more structural components, the insert having a top opening dimensioned to receive the hardware component.

6. The device of claim 5, wherein the top opening is flush with the top surface of each of the one or more structural components.

7. The device of claim 1, the insert insertable at one of the one or more structural components at a cavity defined at a lateral surface of the structural component, the insert having an opening dimensioned to receive the hardware component.

8. The device of claim 7, the opening being a top opening.

9. The device of claim 1, the insert being releasably engaged with the one or more structural components.

10. The device of claim 1, the insert being retained by the one or more structural components, wherein the retention resists separation between the insert and the one or more structural components.

11. The device of claim 1, the insert being connectible to the hardware component at a channel in the insert.

12. An assembly, comprising:

one or more structural components;

flexible insert laterally insertable at the one or more structural components;

a panel; and a hardware component connectible to the flexible insert and to the panel to releasably secure the panel to the one or more structural components, the panel movable at the flexible insert relative to at least one of the one or more structural components.

13. The assembly of claim 12, the insert insertable at the one or more structural components at one or more cavities each defined at a top surface of each of the one or more structural components, the insert having a top opening dimensioned to receive the hardware component.

14. The assembly of claim 12, the insert insertable at one of the one or more structural components at a cavity defined at a lateral surface of the structural component, the insert having an opening dimensioned to receive the hardware component.

15. The assembly of claim 12, the insert being retained by the one or more structural components, wherein the retention resists separation between the insert and the one or more structural components, wherein the panel is secured to permit vibrational movement of the panel.

16. The assembly of claim 12, the panel directly contacting the one or more structural components but not directly contacting the insert.

17. The assembly of claim 12, the panel directly contacting the insert and not directly contacting the one or more structural components.

18. A method for connecting a panel, comprising:

impeding vibration of the panel relative to a hardware component, the hardware component connectible to a flexible insert, the flexible insert releasably laterally connected to one or more structural components, the panel movable at the flexible insert relative to at least one of the one or more structural components.

19. A method for assembling an assembly for a panel, comprising:

inserting flexible insert laterally into a cavity of one or more structural components; and releasably securing the panel to at least one of the one or more structural components at the insert using a hardware component, the panel configured for vibrational movement, the panel movable at the flexible insert relative to at least one of the one or more structural components.

* * * * *